United States Patent [19]

Collette

[11] Patent Number: 4,649,068
[45] Date of Patent: Mar. 10, 1987

[54] PREFORM FOR USE IN BLOW MOLDING A CONTAINER SUBJECTED TO HOT FILLING AND CLOSED BY A ROTATABLE CLOSURE, AND METHOD OF AN APPARATUS FOR MAKING THE SAME

[75] Inventor: Wayne N. Collette, Merrimack, N.H.

[73] Assignee: Continental Pet Technologies, Inc., Stamford, Conn.

[21] Appl. No.: 725,540

[22] Filed: Apr. 22, 1985

[51] Int. Cl.⁴ ............................................. B65D 1/00
[52] U.S. Cl. ................................... 428/35; 215/1 C; 215/31; 428/542.8
[58] Field of Search .............. 428/542.8, 35; 215/1 C, 215/31

[56] References Cited

U.S. PATENT DOCUMENTS

| | | | |
|---|---|---|---|
| 3,961,113 | 6/1976 | Marco | 428/35 |
| 4,288,478 | 9/1981 | Kinoshita et al. | 428/542.8 X |
| 4,330,579 | 5/1982 | Ota et al. | 428/542.8 X |
| 4,333,904 | 6/1982 | Jakobsen | 264/533 X |
| 4,374,878 | 2/1983 | Jakobsen et al. | 428/542.8 X |
| 4,406,854 | 9/1983 | Yoshino | 428/542.8 X |
| 4,463,056 | 7/1984 | Steele | 428/542.8 |

FOREIGN PATENT DOCUMENTS

| | | | |
|---|---|---|---|
| 1436468 | 3/1966 | France | 264/538 |
| 54-66969 | 5/1979 | Japan | 264/533 |

*Primary Examiner*—Henry F. Epstein
*Attorney, Agent, or Firm*—Charles E. Brown

[57] ABSTRACT

This relates to a preform which is injection molded and which is especially intended for use in the blow molding of a container suitable for receiving a hot fill product. Most particularly, the neck finish of the preform, which becomes the neck finish of the resultant blow molded container, is reinforced against axial compression or foreshortening as may occur when the neck finish is heated to a temperature approaching the glass transition temperature of the polyester from which the neck finish is formed. So as to resist deformation of the neck finish, the neck finish is provided on the interior surface (mouth) thereof with a plurality of axially extending, radially inwardly projecting, circumferentially spaced ribs. If the thread means of the neck finish for receiving a closure is of the interrupted type, there will be at least one rib for each thread element.

11 Claims, 5 Drawing Figures

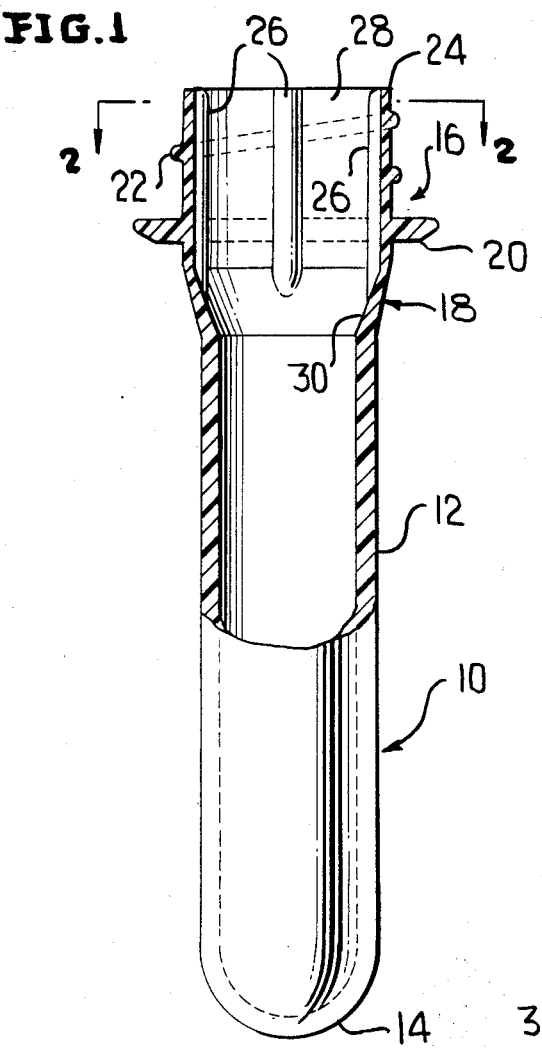
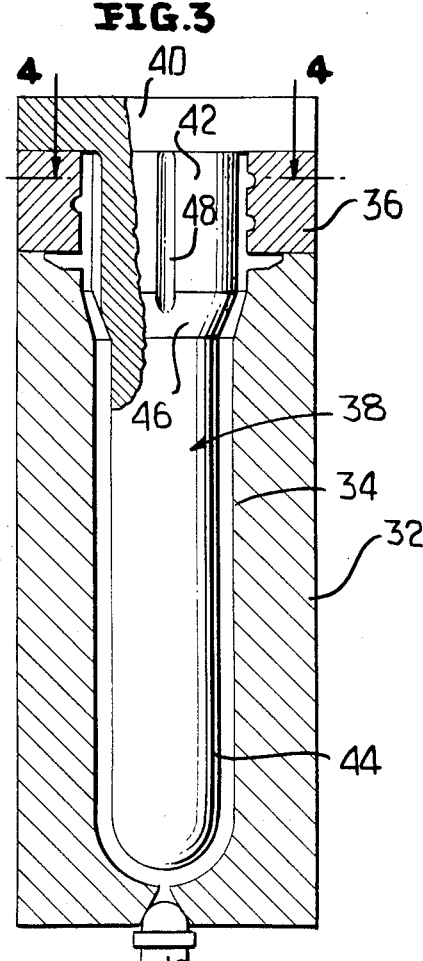
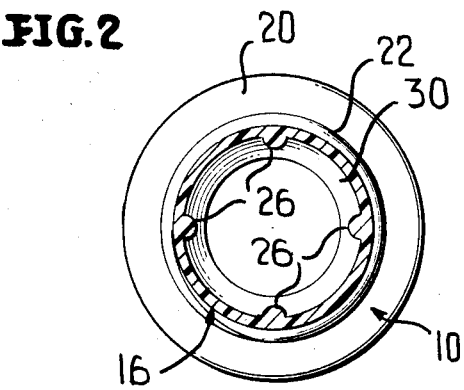
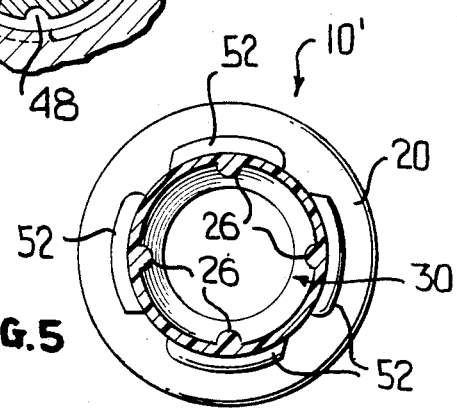

PREFORM FOR USE IN BLOW MOLDING A CONTAINER SUBJECTED TO HOT FILLING AND CLOSED BY A ROTATABLE CLOSURE, AND METHOD OF AN APPARATUS FOR MAKING THE SAME

This invention relates in general to new and useful improvements in blow molded polyester containers and more particularly to a preform which is blow molded to provide a polyester container with improved thermal performance for use in packaging hot fill products.

Polyester (PET) containers with improved thermal performance are beginning to penetrate hot fill packaging markets once held exclusively by metal and glass. There is, however, one technical hurdle to be overcome by PET and like polyester containers produced with standard injection molded preforms. That is shrinkage and distortion of the molded neck finish when exposed to elevated fill temperatures combined with compression forces thereon caused by the application of a cap or closure which tightly seals against the end surface of the neck finish. A combination of shrinkage and creep (distortion under load) occurs when the temperature of the polyester is above its glass transition (or softening temperature) and can result in seal failure.

This invention relates to a novel manner of reinforcing the container neck finish utilizing a special preform which is of a conventional type in that the container neck finish is formed at the time of injection molding the preform. Most particularly, axially extending, radial projections or ribs are formed on the inner surface of the neck finish with these ribs serving to prevent axial collapse of the neck finish under pressure.

BRIEF DESCRIPTION OF THE DRAWINGS

With the above and other objects in view that will hereinafter appear, the nature of the invention will be more clearly understood by reference to the following detailed description, the appended claims, and the several views illustrated in the accompanying drawing.

FIG. 1 is an elevational view with portions broken away and shown in section of a preform formed in accordance with this invention.

FIG. 2 is a transverse horizontal sectional view taken generally along the line 2—2 of FIG. 1 and shows specifically the cross section and arrangement of the reinforcing ribs.

FIG. 3 is a fragmentary sectional view taken through a mold apparatus for forming the preform of FIG. 1.

FIG. 4 is a fragmentary horizontal sectional taken generally along the line 4—4 of FIG. 3.

FIG. 5 is a top plan view of a modified form of preform.

Referring now to the drawings in detail, reference is first made to FIG. 1 wherein there is illustrated a preform formed in accordance with this invention, the preform being generally identified by the numeral 10. The preform 10 is of an injection molded construction and includes a lower elongated tubular body 12 terminating in a generally hemispherical bottom end 14. The upper end of the preform 10 is in the form of a neck finish 16 which is connected to the tubular portion 12 by means of an intermediate portion 18. It is to be noted that the intermediate portion is of a frustoconical configuration and while it tapers in diameter downwardly, it also increases in wall thickness downwardly.

The neck finish 16 is provided with a conventional handling flange 20 and above the flange 20 the neck finish illustrated in FIG. 1 includes a continuous thread 22. The neck finish 16 further terminates in an end sealing surface 24.

The preform 10, as described above, is basically conventional. The preform is improved by the provision of a plurality of longitudinally extending, radially inwardly projecting ribs 26. In the case of the continuous thread 22, the thread is axially reinforced by the ribs 26 which are uniformly spaced about the circumference of the interior of the neck finish 16 which defines a generally cylindrical mouth 28. As is best shown in FIG. 2, the ribs 26 are of a generally half circular cross section and are molded integrally with the inner surface of the neck finish 16, i.e. the surface which defines the mouth 28.

A principal feature of each of the ribs 26 is that it terminates in a natural transition into the intermediate portion 18, and more particularly to the inner surface 30 of such intermediate portion 18.

As will be obvious from FIGS. 1 and 2, the radial extent of each of the ribs 26 is less than one-half the difference in the diameter of the interior surface 30 at the upper and lower ends thereof. In this manner in section or plan, as is clearly shown in FIG. 2, the ribs 26 terminate in the surface 30 as a natural transition.

Referring now to FIGS. 3 and 4, it will be seen that there is illustrated the molding apparatus for forming the preform 10. The molding apparatus is of a conventional construction and normally will include a mold 32 having formed therein a plurality of mold cavities 34 of which one only has been illustrated. The mold cavity 34 terminates at the top of the mold 32 at the top of the flange 20.

The mold 32 is completed by a neck ring 36 which defines the exterior of the neck finish 16 above the flange 20, including the continuous thread 22. Finally, the molding apparatus includes a core 38 which is telescoped within the mold cavity 34 and defines the interior surface of the preform 10. The core 38 is carried by a base plate 40.

It will be seen that the core 38 includes a large diameter base 42 which is connected to a smaller diameter body portion 44 by an intermediate portion 46 which tapers in diameter and is generally of a frustoconical outline.

The molding apparatus, as described, is conventional. However, in accordance with this invention, the molding apparatus has been modified by modifying the core 38. Most particularly, the base 42 has formed in the outer surface thereof longitudinally extending grooves 48 which are preferably of a semi-circular cross section. The grooves 48 normally will be formed by a simple milling operation utilizing a cutter having a half circular outer shape.

Because the depth of the grooves 48 is less than the minimum diameter of the frustoconical portion 46, and since the grooves 48 are parallel to the axis of the core 38, it will be seen that the grooves 48 terminate in a natural transition within the intermediate portion 46. Thus before the cores 38 are assembled with the base plate 40, it is merely necessary to mill the grooves 48 or otherwise form the same with the forming tool passing out through the outer surface of the intermediate portion 46.

While the grooves 48 extend through the base plate 40, it is also possible to terminate the milling operation short of the end of the large end portion 42. However, as illustrated in FIG. 1, the extreme ends of the ribs 26 terminate coplanar with the sealing surface 24 and axially form a radially inner extension thereof. However, if the grooves 48 are stopped short of the base plate 40, there will be a clearance between the ends of the ribs 26 and the end sealing surface 24.

In practice, the molding apparatus is associated with an injection head 50 and the desired polyester or thermoplastic resin is injected into the mold cavity 34 about the core 38. As a result, in a simple operation the preform 10 will be formed.

It is to be understood that when the preform 10 is formed into a container, it will be placed in a blow mold with the flange 20 seated at the end of the blow mold. The neck finish 16, although heated to a certain degree, will not be internally pressurized and therefore will not be stretched and thus biaxially oriented. Unlike prior art teachings wherein bottom portions of preforms have integral ribs formed on the inner surface thereof to facilitate the retention of the preform material in the base of the resultant container, the ribs 26 are not subject to any blow molding operation or, at a minimum, only the lower portions of the ribs 26 are radially outwardly deformed and stretched.

While only four ribs 26 have been specifically illustrated, it is to be understood that the number of ribs may be varied depending upon the thread configuration and the pressures involved. A further consideration will be the diameter of the neck finish. For larger diameter neck finishes, six or even eight ribs may be utilized.

Reference is now made to FIG. 5 wherein there is illustrated a slightly modified form of preform which is generally identified by the numeral 10'. The preform 10' differs from the preform 10 only in that in lieu of the continuous threads 22, the thread means are of the interrupted or lug type with there being circumferentially spaced lug or thread elements 52. With this construction, each lug or thread element is reinforced by at least one of the ribs 26. When there is a single rib 26 for each thread element 52, the rib is preferably centered in a circumferential direction with respect to the thread element 52. It is, of course, feasible that there would be two or more ribs 26 for each thread element 52.

It will be readily apparent that the resultant neck finish of a blow molded container formed utilizing the preform 10 will be reinforced against axial compression which is effected by the application of a screw threaded closure or cap. It will be readily apparent to one skilled in the art that the threads on the cap in combination with the axial thrust of the resultant end seal would tend to tension the skirt of the closure or cap which, in turn, will serve to compress in an axial direction the upper part of the neck finish 16. The ribs 26 serve to resist this axial compression when the closure is applied at a time wherein the neck finish material is heated to a softening temperature.

At this time it is pointed out that the provision of the ribs 26 in no way interfere with the removal of the preform 10 from the molding apparatus. After the preform 10 has been formed by injection molding within the cavity 34, the core 38 is removed from the mold 32 together with the neck ring 36. There will be no problem stripping the preform from the cavity 34. Then the preform, while held by the neck ring 36, will have the core 38 withdrawn therefrom. Once again there is no interference between the preform and the molding apparatus part which is being moved relative thereto so that stripping of the core 38 may be effected without any hangup.

Finally the preform is removed from the neck ring 36 and is ready to be utilized in a blow molding operation to form a container suitable for hot filling.

Although only two preferred embodiments of the preform have been specifically illustrated and described herein, it is to be understood that minor variations may be made in the preform construction and the method of an apparatus for making such preform without departing from the scope of the invention as defined by the appended claims.

I claim:

1. A preform for use in blow molding a polyester container subjected to hot filling and closed by a rotatable closure, said preform having an as formed container neck finish and a tubular body to be subjected to both axial and hoop direction stretching, said neck finish including external thread means for receiving a closure, said preform being improved by said neck finish defining a container mouth having an internal diameter greater than said tubular body internal diameter, said mouth being joined to said tubular body interior by an inverted generally conical surface, and said neck finish being reinforced by internal axially extending structural shape maintaining ribs projecting radially inwardly from said mouth, said ribs forming means for preventing axial collapse of said neck finish.

2. A preform according to claim 1 wherein the radial extent of each of said ribs is less than one-half of the difference in diameters of said conical surface at opposite ends thereof, and said ribs terminate with and at said conical surface.

3. A preform according to claim 1 wherein the radial extent of each of said ribs is less than one-half of the difference in diameters of said conical surface at opposite ends thereof, and said ribs terminate within and at said conical surface in natural transition due to the taper of said conical surface.

4. A preform according to claim 1 wherein said thread means is in the form of a continuous thread and said ribs are evenly circumferentially spaced.

5. A preform according to claim 1 wherein said thread means are in the form of separate circumferentially spaced thread elements and there is at least one of said ribs for each of said thread elements.

6. A preform according to claim 1 wherein said thread means are in the form of separate circumferentially spaced thread elements and there is one of said ribs for each of said thread elements.

7. A preform according to claim 1 wherein said thread means are in the form of separate circumferentially spaced thread elements and there is one of said ribs for each of said thread elements, each rib being centered with respect to a respective thread element.

8. A preform according to claim 1 wherein said mouth terminates in an end sealing surface of a resultant container.

9. A preform according to claim 1 wherein said mouth terminates in an end sealing surface of a resultant container, and said ribs extend to said end sealing surface.

10. A preform according to claim 1 wherein said ribs are of a generally half circular cross section.

11. A preform according to claim 1 wherein said preform is of the injection molded type.

* * * * *